Figure 1:
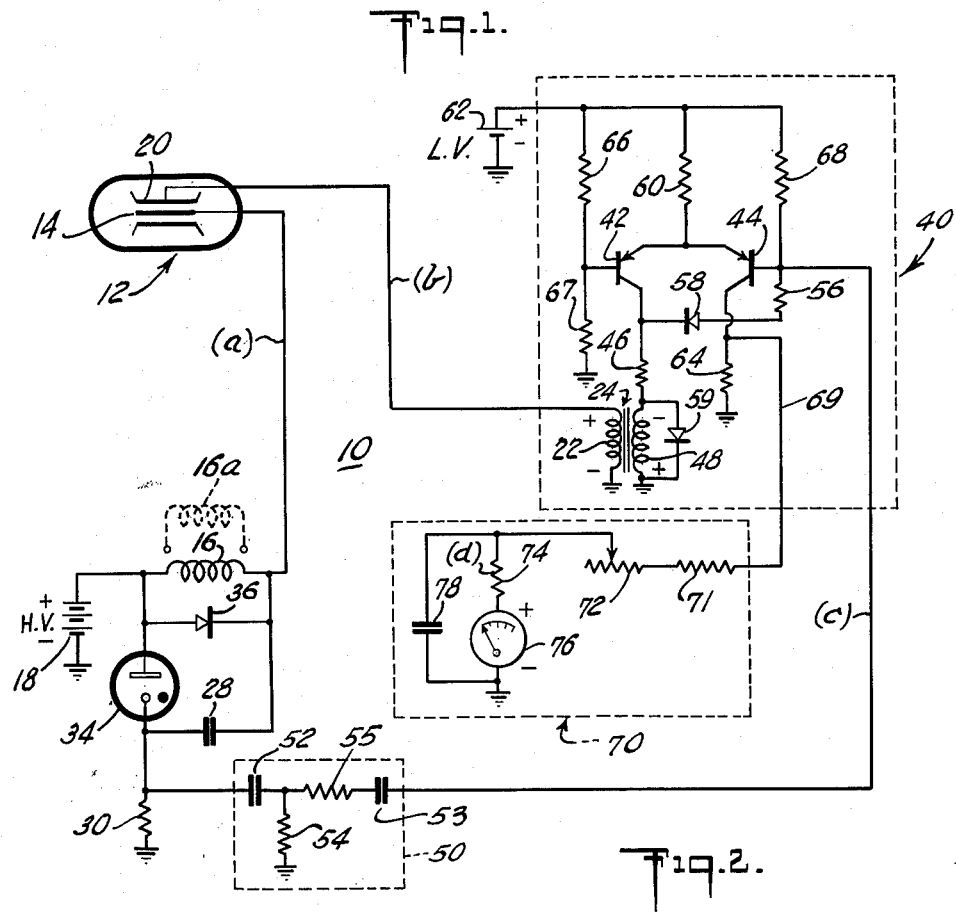

May 9, 1961  J. M. CONSTABLE  2,983,818

RADIATION METER

Filed Oct. 22, 1957

INVENTOR:
JAMES M. CONSTABLE
BY
Curtis, Morris & Safford.
ATTORNEYS:

2,983,818
Patented May 9, 1961

2,983,818
RADIATION METER

James M. Constable, White Plains, N.Y., assignor to Electronic Products Company, Mount Vernon, N.Y.

Filed Oct. 22, 1957, Ser. No. 691,663

10 Claims. (Cl. 250—83.6)

This invention relates to a device for measuring penetrating radiation and more particularly, it relates to such a device for measuring high intensity radiation.

An object of this invention is to provide a radiation measuring instrument which can measure high intensity radiation with substantially improved accuracy.

A more specific object is to provide such an instrument which is small enough and light enough to be truly portable and which can operate efficiently for long periods of time on self-contained flashlight batteries.

Another object is to provide in an instrument of this kind a relatively simple and inexpensive electrical circuit using a Geiger-Müller tube and having greatly improved operating efficiency, stability, and accuracy.

These and other objects will in part be pointed out in and in part understood from the following description.

A Geiger-Müller (G-M) tube is a convenient device for measuring radiation because it is relatively inexpensive, and because it is small, rugged and reliable. It is therefore widely used in radiation measuring instruments. However, it has several shortcomings which for some applications vitiate its many advantages. Among these shortcomings is the fact that above a certain radiation level a G-M tube will block, i.e. it will conduct continuously so that the output signal from it is no longer a series of discrete pulses whose rate of occurrence is proportional to radiation intensity. When blocking is present it is very difficult to get a useful measure of the radiation impinging on the G-M tube.

Another shortcoming with a G-M tube is that the output signal from it is in the form of low current pulses at high impedance. This makes it difficult, most especially in a portable instrument where size and power drain must be kept to absolute minimums, to convert the tube signals into a visible quantative measurement, such as a reading on a relatively low-resistance micro-ammeter. The present invention provides an electrical circuit using a G-M tube which overcomes these shortcomings while retaining the many advantages of such a tube.

In accordance with the present invention there is provided a G-M tube radiation measuring circuit wherein the tube is pulsed "on" by short energizing pulses. The signal pulses, if any, from the tube are then compared with the energizing pulses in a "coincidence" circuit which is arranged to switch on current to a microammeter if there is coincidence between a signal and an energizing pulse, but to switch off the current if there is no coincidence. The current controlled by the coincidence circuit comes from a low resistance source, such as a battery, and since this current is in the form of long duration, low impedance pulses, as distinguished from the sharp voltage spikes produced by the G-M tube, there is no problem in coupling to a low-resistance meter. Furthermore, as will be explained more fully later on, by virtue of the pulse coincidence circuit, the accuracy and calibration of the meter reading is effectively independent over a wide range of frequency or repetition rate of the energizing pulses applied to the G-M tube. In addition, since the microammeter is not energized directly by the pulses from the G-M tube, the meter reading is not noticeably affected by variations over a wide range in the amplitudes of these pulses. Because of this, normal differences or variations in the characteristics of mass-produced G-M tubes are easily permitted in this circuit and very expensive, specially produced G-M tubes are not required.

The particular "coincidence" circuit described herein includes two transistors arranged as a flip-flop or bi-stable multivibrator to switch current to the meter either on or off. These transistors are either fully conducting or fully off, and accordingly the power loss in them is completely negligible; moreover since they are used as switches rather than as amplifiers their action is not sensitive to wide variations in temperature. In fact, one radiation meter employing transistors which has been built and tested gave virtually an absolutely steady reading for constant radiation over a temperature range of —20° C. to +50° C.

A better understanding of the invention together with a fuller appreciation of its many advantages will best be gained from the following description given in connection with the accompanying drawings in which:

Figure 1 is a schematic diagram of a circuit embodying features of the invention; and Figures 2(a), (b), (c) and (d) show the time relationships of electrical pulses occurring at different points in the circuit, as indicated by corresponding letters in Figure 1.

The circuit 10 shown in Figure 1 includes a G-M tube 12 which is adapted to be exposed to penetrating radiation. The anode 14 of this tube is direct current connected via the inductor 16 to a high voltage battery 18 whose negative side is grounded. The cathode 20 of tube 12 is connected to ground through the primary winding 22 of a transformer 24. The voltage supplied by battery 18 to the G-M tube is sligtly less than enough to normally energize the tube for conduction when the gas in it is ionized by a ray of radiation. However, short, sharp voltage pulses are periodically generated across inductor 16 and these add in series with the battery voltage to raise the anode of the G-M tube to conduction. The generation of these energizing pulses is accomplished by the charging from battery 18 through inductor 16 of the capacitor 28 through the resistor 30. When the voltage on the capacitor equals the breakdown voltage of the cold-cathode gas discharge diode 34, this diode momentarily conducts and suddenly connects capacitor 28 in charged condition across the inductor. The resulting partial discharge of the capacitor into the inductor then produces a positive pulse having a duration determined by the resonant frequency of the inductor and the capacity in parallel with it. The repetition rate of these pulses is determined by the charging time-constant of capacitor 28 and resistor 30 in series, the resistance of inductor 16 being negligible. Each time the pulse voltage across inductor 16 tries to go negative, it is clipped by the crystal diode 36. The pulsing action of the elements just described is explained in complete detail in the inventor's co-pending application Serial No. 543,780, filed October 31, 1955, now U.S. Patent No. 2,833,931. This mode of operation of the G-M tube prevents blocking under high intensity radiation.

Each time G-M tube 12 is pulsed on by the short duration pulses generated across inductor 16, the tube can then break down and conduct current through it. Whether it does so conduct is a function of the intensity of the radiation impinging on the tube and the duration of the pulse from inductor 16. Therefore, by detecting the signal pulses at the cathode of the G-M tube for a given width of inductor pulses, it is possible to accurately measure the intensity of the radiation impinging on the G-M tube. By simply changing the width of the pulses from inductor 16, the scale of measurement of the meter can be changed. Thus the measuring range of the instrument can easily be switched from high to low intensity radiation and vice-versa. This also is explained in the above mentioned co-pending application. In the circuit here, however accuracy of measurement is virtually independent of the repetition frequency of the energizing voltage pulses applied to G-M tube 12 by inductor 16 and so the range of the instrument can be changed simply by switching from inductor 16 to another one of proper value, for example, the inductor 16a shown by dotted lines. It is not necessary for linearity in this circuit to adjust the values of capacitor 28 and resistor 30 in switching from one range to another.

The detection of the signal pulses from G-M tube 12 is accomplished in accordance with the embodiment of the invention illustrated herein by the coincidence circuit generally indicated at 40. This includes two transistors 42 and 44 connected together as a bi-stable multivibrator. The collector of transistor 42 is connected in series to ground with the resistor 46 and the secondary 48 of transformer 24, the primary of which is connected in series with the cathode of G-M tube 12. The base of transistor 44 is connected through the pulse sharpening filter 50 across resistor 30 in the previously described network which generates energizing pulses across inductor 16. Filter 50 includes the capacitors 52 and 53 and the resistors 54 and 55. The base of transistor 44 is also connected through resistor 56 and diode 58 to the collector of transistor 42.

When G-M tube 12 is pulsed on by an energizing pulse from inductor 16, the tube may or may not produce an output pulse. Assuming that it does, this pulse is coupled negatively through transformer 24, the polarities of windings 22 and 48 being reversed as indicated, the resistor 46, diode 58 and resistor 56 to the base of transistor 44. Simultaneously a positive pulse from network 50 is directly coupled to the base of transistor 44. Since the latter pulse has a much shorter duration than that of the pulse from the G-M tube, the shorter positive pulse will have ended well before the longer negative one from the G-M tube and transistor 44 will be turned on. If it happens that no pulse is produced by G-M tube 12 when energized by a pulse from inductor 16, a pulse corresponding to the latter, though considerably sharpened by filter 50, will turn transistor 44 off. When transistor 44 is turned off, it turns transistor 42 on, the transistors remaining in this condition until the next occurrance of a G-M tube pulse. By coupling the signal pulses from G-M tube 12 negatively through transformer 24 into the base of transistor 44 rather than positively into the base of transistor 42, the possibility of false operation by feed-through in the G-M tube of a portion of the energizing pulses, is minimized. This is so because the feed-through pulses are very short in duration relative to the signal pulses and accordingly are capacitively coupled through transformer 24 without reversal of polarity. The secondary winding 48 of transformer 24 is shunted by a diode 59 to prevent the voltage across the winding from going positive relative to ground.

The bi-stable operation of coincidence circuit 40 will readily be understood by those familiar with multivibrators. Briefly, though this operation is as follows. When a positive pulse is applied to the base of transistor 44 it will be driven to cutoff if it is not already in this condition. When this happens the current, which was previously flowing through the transistor into its emitter from resistor 60 and the battery 62 and out of its collector through resistor 64 to ground, stops. The resultant decrease in the voltage drop across resistor 60 causes the emitter of transistor 42 also connected to this resistor to become more positive. This in turn, since the base of this transistor is effectively fixed biased from battery 62 through the voltage dropping resistors 66 and 67, causes transistor 42 to turn on. Current then flows through it from its emitter to its collector and thence to ground through resistor 46 and winding 48, the resistance of this winding being negligible. The voltage drop across resistor 46 is coupled to the base of transistor 44 through diode 58 and resistor 56 causing it to become enough positive, aided by the bias resistor 68 connected between the base and battery 62, to keep transistor 44 turned off. It remains in this condition until the next pulse from G-M tube 12 occurs. Transistor 42 when conducting passes less current than does transistor 44 when conducting.

Transistor 44 will again be turned on by the next occurring G-M tube pulse. The increased voltage drop across resistor 60 caused by the conduction of transistor 44 causes the emitter of transistor 42 to become enough less positive to cut it off. The collector of transistor 42 then falls to ground potential and this in turn causes the base of transistor 44 to become enough less positive to keep the latter turned on.

Current flowing in transistor 44 causes a voltage drop across its collector resistor 64. This voltage is applied through a lead 69 to a metering circuit generally indicated at 70 and which includes in series to ground a resistor 71, a calibrating resistor 72, a balancing resistor 74 and a microammeter 76. A large smoothing capacitor 78 is shunted across meter 76 and resistor 74.

The reading of meter 76 is proportional to the time average of the voltage across resistor 64 and since, as will be demonstrated, this average voltage is proportional to the rate of occurrance per unit of time of pulses from the G-M tube, the meter reading is proportional to radiation impinging on the tube.

Figure 2:
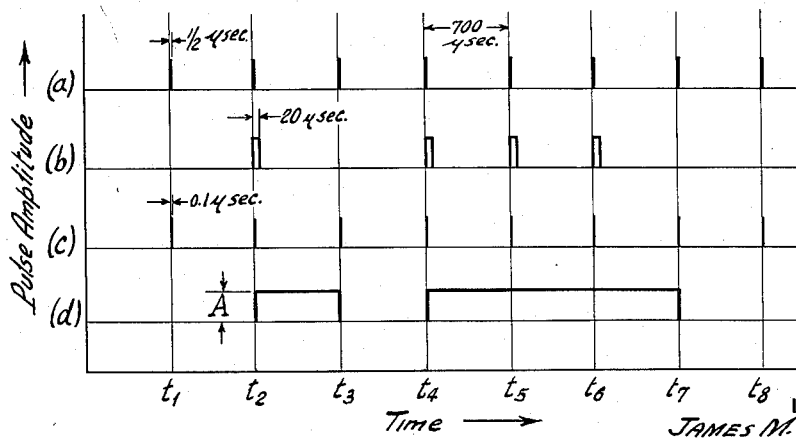

The operation of circuit 10 is graphically illustrated in Figure 2. Line $a$ of this figure represents the time sequence of the energizing pulses applied to the G-M tube, line $b$ represents the signal pulses from the G-M tube applied to the primary of transformer 24, line $c$ represents the sharp pulses from filter 50 applied to the base of transistor 44, and line $d$ represents the current applied to meter 76. The approximate durations and spacings of these pulses for the circuit described herein are indicated in microseconds ($\mu$ sec.).

Assuming that at time $t_1$ no signal pulse from the G-M tube occurs, as indicated by line $b$, then the corresponding filter pulse, indicated by line $c$ will leave the current to the meter off, as indicated by line $d$. If at time $t_2$ when the next energizing pulse occurs, there occurs a signal pulse from the G-M tube, then the current to the meter will be turned on and remain on until the next pulse time $t_3$. If at $t^3$, a signal pulse fails to appear, then current to the meter will be switched off and remain off until the next signal pulse does appear. Now, if at time $t_4$ a signal pulse again appears, line $b$, current will be turned on and will flow to the meter, line $d$. This current will remain on until the next interval when a signal pulse fails to occur, for the condition indicated the current remains on until $t_7$. This switching on or off of current continues for future intervals in the way described above.

It is seen from Figure 2 that the average current applied to meter 76 is determined by the coincidences of signal pulses and energizing pulses. This average current, expressed as $$I \text{ equals } \left(N \times \frac{A}{ppr}\right)$$

where N is the number of G-M tube pulses per unit of time, $ppr$ is the repetition rate or frequency of the energizing pulses, and A is the maximum amplitude of current and is constant. However N equals ($Kppru$) where K is a proportionality factor and $u$ is the time duration of the energizing pulses and is constant for a given value of inductor 16. Thus I equals $KuA$ and is effectively independent of the repetition rate of the energizing pulses, assuming of course that the pulses are of very short and uniform duration and assuming that the pulse repetition rate is not rapidly changing. However, both assumptions are entirely justified in actual practice. In fact, in a circuit which has been built and successfully tested, the repetition rate of the energizing pulses could be varied over a two-to-one range without changing the meter reading for a given intensity of radiation. Since the signal pulses from the G-M tube are not directly metered, these pulses can vary in amplitude without adversely effecting the accuracy of the circuit. This as explained previously, means that a less stable, hence less expensive G-M tube will be satisfactory.

In a circuit which has been built and which is substantially the same as that shown in Figure 1, the following elements and voltages are used: G-M tube 12, type EP72M manufactured by Electronic Products Co.; gas diode 34, type EP 92 manufactured by Electronic Products Co.; battery 18, 680 volts; battery 62, 6.5 volts; inductor 16, about 2.4 millihenries; capacitor 28, 91 micro micro farads ($\mu\mu f$); resistor 30, 10 megohms; diode 58, type 1N461 silicon ½ volt forward conduction; diode 59, type DR325; diode 36, type 1N218; resistor 54, 10,000 ohms; resistor 55, 100,000 ohms; capacitor 52, 5 $\mu\mu f$; capacitor 53, 15 $\mu\mu f$; resistor 46, 8,200 ohms; resistor 56, 6,200 ohms; resistor 60, 2,400 ohms; resistor 64, 3,000 ohms; resistor 66, 22,000 ohms; resistor 67, 30,000 ohms; resistor 68, 180,000 ohms; transistors 42 and 44, each type 2N240 PNP; resistor 71, 80,000 ohms; potentiometer 72, 25,000 ohms; resistor 74, 1,500 ohms; capacitor 78, 500 microfarads; meter 76, 50 microamperes and approximately 1,000 ohms resistance; and transformer 24, type UTC-dot 10. The pulses developed across inductor 16 were approximately 150 volts in amplitude and had a duration of approximately ½ microsecond and a repetition rate of roughly 1,500 per second. The operating voltage of G-M tube 12 was approximately 700 volts and the circuit had an accurate full scale range of 500 Roentgens per hour. By switching an inductor 16a of 24 henrys in place of inductor 16, full scale range of the instrument could be lowered to 5 R/hr.

The above description of the invention is intended as an illustration of its general principals and is not to be understood as restricting the invention to the particular embodiment described and illustrated. Various changes in the circuit illustrated may occur to those skilled in the art and these can be made without departing from the spirit or scope of the invention as set forth.

I claim:

1. In a portable radiation measuring instrument wherein high accuracy and low power drain are desired, a G-M tube, voltage pulse source means for supplying short sharp energizing pulses to said tube, bi-stable switch means adapted to receive two input signals and having an output adapted to be switched either on or off, meter means connected to the output of said switch means, means connecting output signals from said G-M tube to said switch means, and means connecting the said pulse source to said switch means, whereby said meter indicates in accordance with the rate of occurrence of pulses from said G-M tube and gives a reading proportional to the radiation impinging thereupon.

2. The instrument as in claim 1 wherein said switch means comprises a multivibrator whose output is turned on whenever a G-M tube pulse occurs, but whose output is turned off when only an energizing pulse occurs and wherein said meter means includes a low resistance microammeter.

3. A highly efficient, very stable and accurate radiation measuring instrument comprising: a device to detect penetrating radiation and in response thereto to apply to an output terminal signal pulses whose rate of occurrence per unit of time is a measure of said radiation, voltage source means for supplying power to said device, pulse supply means for generating energizing pulses of uniform and short duration, said supply means being connected between said output terminal and said source means to permit signal pulses at said output terminal only during the occurrence of said short energizing pulses, a bi-stable coincidence circuit, means to couple signal pulses from said device into said circuit, means to couple energizing pulses into said circuit, and meter means connected to said coincidence circuit, said coincidence circuit being adapted to apply energy to said meter means or not in accordance with the coincidence or non-coincidence of signal with energizing pulses applied to itself.

4. The instrument as in claim 3 wherein said coincidence circuit includes two transistors having their emitters connected together to a common load resistor, and having their collectors connected to separate resistors in series with a common point, means separately biasing the bases of said transistors, means conductively connecting the base of one transistor to the collector of the other, said meter means being connected to the collector of one transistor, said transistors being biased so that turning one on turns the other off, and vice versa.

5. The instrument as in claim 3 wherein said pulse supply means applies pulses in series adding with said voltage source means to drive said G-M tube into its conducting region only during said energizing pulses, the voltage of said source means alone being less than enough to energize said G-M tube.

6. The instrument as in claim 3 wherein said means to couple signal pulses into said coincidence circuit includes an element which discriminates against short duration feed-through pulses but which effectively passes the longer duration signal pulses to said circuit.

7. The instruments as in claim 5 wherein said pulse supply means includes an inductor and a relaxation oscillator having a capacitor which is adapted to be periodically switched in charged condition momentarily across said inductor.

8. The instrument as in claim 7 in further combination with means to change the value of said inductor alone to switch the range of measurement of said instrument.

9. A highly accurate, high range, portable radiation measuring device comprising a G-M tube, a voltage supply, an inductor connected in series with said supply and said G-M tube, a gas-discharge diode, and a capacitor connected in series across said inductor, a resistor connected to said capacitor and in series with said supply so that said capacitor will charge to a voltage sufficient to break down said diode and discharge said capacitor into said inductor to generate a voltage pulse adding in series with said supply, a bi-stable flip-flop coincidence circuit having two inputs and an output, means connecting one of said inputs to said G-M tube, means connecting the other of said inputs to said resistor, and a microammeter connected to said output whereby a pulse from said G-M tube occurring with a pulse across said inductor will cause current to flow in said meter, which current flows until a pulse occurs across said inductor and is not accompanied by a pulse from said G-M tube whereupon the current in said meter is cut off and will remain off until the next coincidence of G-M tube and inductor pulses.

10. Apparatus for efficiently and accurately measuring penetrating radiation comprising radiation detecting means having an output and being adapted to emit very short duration electrical signals at a rate indicative of the intensity of radiation, control means to permit said signals at said output at spaced apart short intervals, meter means, and logical switching means to determine whether a signal from said detecting means occurred at said output during each of said intervals and if so to energize said meter means but if not to de-energize said meter means until the next interval, and so on, whereby said meter means gives an accurate measure of radiation intensity.

References Cited in the file of this patent

UNITED STATES PATENTS

| | | |
|---|---|---|
| 2,612,743 | Strother | Oct. 7, 1952 |
| 2,716,523 | Driver | Aug. 30, 1955 |
| 2,744,198 | Raisbeck | May 1, 1956 |
| 2,809,303 | Collins | Oct. 8, 1957 |
| 2,816,237 | Hageman | Dec. 10, 1957 |
| 2,824,237 | Witzel | Feb. 18, 1958 |
| 2,829,269 | Peacock et al. | Apr. 1, 1958 |
| 2,838,680 | Bender et al. | June 10, 1958 |
| 2,866,100 | Leaver | Dec. 23, 1958 |
| 2,883,551 | Zito | Apr. 21, 1959 |
| 2,903,605 | Barney et al. | Sept. 8, 1959 |

FOREIGN PATENTS

| | | |
|---|---|---|
| 677,676 | Great Britain | Aug. 20, 1952 |

OTHER REFERENCES

Transistors Handbook by W. D. Bevitt, 1956, Prentice-Hall Inc., pp. 328–334.